United States Patent
Labban et al.

(10) Patent No.: US 11,638,903 B2
(45) Date of Patent: May 2, 2023

(54) DEFORMATION-ENHANCED CLEANING OF FOULED MEMBRANES

(71) Applicant: Massachusetts Institute of Technology, Cambridge, MA (US)

(72) Inventors: Omar Labban, Cambridge, MA (US); Grace Goon, Singapore (SG); John H. Lienhard, Lexington, MA (US); Xuanhe Zhao, Allston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 123 days.

(21) Appl. No.: 17/068,239

(22) Filed: Oct. 12, 2020

(65) Prior Publication Data

US 2021/0106951 A1 Apr. 15, 2021

Related U.S. Application Data (63) Continuation of application No. PCT/US2020/055175, filed on Oct. 11, 2020.

(60) Provisional application No. 62/913,984, filed on Oct. 11, 2019.

(51) Int. Cl.
B01D 65/02 (2006.01)

(52) U.S. Cl.
CPC ...... *B01D 65/02* (2013.01); *B01D 2321/2066* (2013.01); *B01D 2321/30* (2013.01)

(58) Field of Classification Search
CPC ........ B01D 33/03; B01D 61/08; B01D 61/18; B01D 61/364; B01D 63/02; B01D 63/06; B01D 63/10; B01D 65/02; B01D 2315/04; B01D 2321/2058; B01D 2321/2066;
(Continued)

(56) References Cited

U.S. PATENT DOCUMENTS

| 4,253,962 A | 3/1981 | Thompson |
| 4,904,394 A * | 2/1990 | Clarke .................. B01D 61/22 210/780 |
| 5,532,980 A | 7/1996 | Zarate et al. |
| (Continued) | | |

OTHER PUBLICATIONS

Wende Li, et al., "Reverse Osmosis Membrane, Seawater Desalination with Vibration Assisted Reduced Inorganic Fouling," 417 Desalination 102-114 (2017).
(Continued)

*Primary Examiner* — Patrick Orme
(74) *Attorney, Agent, or Firm* — Modern Times Legal; Robert J. Sayre (57) ABSTRACT

Enhanced cleaning of a fouled membrane is achieved via controlled deformation in a method wherein a feed composition, comprising a solvent and dissolved components, flows into a retentate side of a membrane module. The solvent passes through the membrane from the retentate side to a permeate or draw side of the membrane module while retaining the dissolved components on the membrane. As a foulant accumulates on either side of the membrane, a driving force is generated across the membrane, wherein the membrane responds cyclically by deforming back and forth toward the permeate or draw side and toward the retentate side. The foulant is dislodged from the membrane via mechanical fatigue at the foulant-membrane interface caused by the deformation of the membrane and contact with a spacer in contact with the membrane.

19 Claims, 3 Drawing Sheets

(58) Field of Classification Search
CPC .......... B01D 2321/22; B01D 2321/223; B01D 2321/24; B01D 2321/30
See application file for complete search history.

(56) References Cited

U.S. PATENT DOCUMENTS

| | | |
|---|---|---|
| 7,282,147 B2 | 10/2007 | Kirker et al. |
| 7,563,375 B2 | 7/2009 | Liberman |
| 10,005,040 B2 | 6/2018 | Liberman et al. |
| 2015/0060359 A1* | 3/2015 | Wang .................... B01D 63/10 210/636 |
| 2015/0251141 A1 | 9/2015 | Mourad et al. |
| 2018/0304205 A1* | 10/2018 | Liberman ............... C02F 1/441 |

OTHER PUBLICATIONS

Emily W. Tow, et al., "Raising Forward Osmosis Brine Concentration Efficiency Through Flow Rate Optimization," 366 Desalination 71-79 (Jun. 2015).

US Patent and Trademark Office, International Search Report and Written Opinion for PCT/US20/55175 (corresponding PCT application) (dated Jan. 29, 2021).

\* cited by examiner

DEFORMATION-ENHANCED CLEANING OF FOULED MEMBRANES

RELATED APPLICATION

This application is a continuation of International Application No. PCT/US20/55175, filed 11 Oct. 2020, the entire content of which is incorporated herein by reference.

This application also claims the benefit of U.S. Provisional Application No. 62/913,984, filed 11 Oct. 2019, the entire content of which is incorporated herein by reference.

BACKGROUND

The discussion of the background state of the art, discussed below, may reflect hindsight gained from the disclosed invention(s); and these characterizations are not necessarily admitted to be prior art.

Since its inception, membrane technology has become instrumental to state-of-the-art water and food supply and safety. Despite remarkable progress over the past decades, membranes remain plagued by fouling, often termed the Achilles heel of membrane processes. Membrane fouling, the process through which particles or solutes are deposited on the membrane surface, is the major cause of membrane flow resistance (product flux decline) and degradation for membranes in operation. Traditionally, membrane cleaning, particularly in reverse osmosis (RO), has been a chemical process, presenting multiple downsides ranging from economic and operational to environmental limitations.

In the dairy industry, for example, production capacities are constrained by the daily shutdown time necessary for membrane cleaning. At some plants, third party companies are called on-site to perform the cleaning, imposing unnecessary production delays. With the world population estimated to increase by 30 percent and the United Nation projecting half the population will experience water scarcity by 2050, the need for technological innovations addressing water and food safety cannot be overstated.

While successful, membranes have been plagued by fouling to which considerable system downtime and lost productivity are attributed. Consequently, further adoption of membranes, for example, has been hindered, sometimes in favor of less energy efficient technologies that mainly present a higher fouling resistance [E. W. Tow, R. K. McGovern, and J. H. Lienhard, "Raising forward osmosis brine concentration efficiency through flow rate optimization," Desalination 366 71-79 (2015)]. Membrane fouling is broadly classified into organic fouling, colloidal fouling, biofouling, and inorganic fouling or scaling. The occurrence of fouling increases the energy consumption of membrane technologies and directly impacts their productivity due to the drop in permeability and system shutdown attributed to the Cleaning in place (CIP) chemical procedure employed afterwards. Chemical cleaning typically involves the introduction of harsh chemicals (HCl/NaOH), biocides ($Cl_2$, $NH_2Cl$), or oxidants ($H_2O_2$, NaOCl) to disrupt and remove the foulant layer.

To counteract the effects of fouling, membrane cleaning is employed. With RO membranes not designed to be hydraulically backwashed, plants resort to chemical cleaning despite the numerous drawbacks. Chemical cleaning, for example, raises environmental concerns associated with chemical waste management and disposal [N. Voutchkov, "Desalination plant concentrate management", Water Treatment Academy (2011)]. Furthermore, a system shutdown is typically inevitable and potentially prolonged given the lack of a universal cleaning agent targeting the different foulants. The cost of chemicals and resulting membrane degradation make the process all the more undesirable.

Chemical cleaning of fouled RO membranes through a process known as CIP is a well-established process representing the current state-of-the-art in this field. Different types of chemical agents are required depending on the type of fouling encountered. Comprehensive reviews of membrane chemical cleaning have been presented by Trägårdh [G. Trägårdh, "Membrane cleaning," Desalination 71 (3) 325-335 (1989)], Porcelli and Judd [N. Porcelli and S. Judd, "Chemical cleaning of potable water membranes: A review," Separation and Purification Technology 71 (2) 137-143 (2010)], and Vedavyasan [C. V. Vedavyasan, "Chemical cleaning of membranes," Springer Berlin Heidelberg, Berlin, Heidelberg, 379-386 (2016)] to name a few, and the reader is referred there for more details. More importantly, the CIP process presents considerable limitations impeding the productivity and profitability of plants in practice while raising safety and environmental concerns. Accordingly, any feasible chemical-free alternative eliminating (or even reducing) the reliance on chemicals and associated shutdown time and cost would be highly desirable and set to benefit from a considerable competitive advantage relative to incumbent technology.

Chemical-free or physical cleaning involves the introduction of mechanical forces that disrupt the foulant layer and ultimately facilitate its detachment. Such cleaning or antifouling mechanisms range from osmotically-induced and vibration-assisted cleaning [U.S. Pat. Nos. 7,563,375 and 10,005,040 B2] to membrane pretreatment and scouring methods, such as aeration of the feed flow [M. Pradhan, S. Vigneswaran, J. Kandasamy, and R. B. Aim, "Combined effect of air and mechanical scouring of membranes for fouling reduction in submerged membrane reactor," Desalination 288 58-65 (2012)] or addition of solid granular particles [B. Wu, F. Zamani, W. Lim, D. Liao, Y. Wang, Y. Liu, J. W. Chew, and A. G. Fane, "Effect of mechanical scouring by granular activated carbon (GAC) on membrane fouling mitigation," Desalination 403 80-87 (2017)].

Osmotically-induced cleaning (OIC) refers to the process through which a membrane is effectively backwashed "osmotically". In this process, the net driving pressure (NDP) is controlled such that the osmotic pressure difference across the membrane becomes the dominant driving force. Water is thus transported by osmosis from the purer permeate side to the more concentrated feed side, causing the foulant layer to experience a variety of mechanisms that potentially encourage detachment [see U.S. Pat. No. 7,563,375].

Other studies in the patent literature have looked into employing vibration as a potential means of membrane fouling mitigation [see U.S. 2015/0251141 A1 and U.S. Pat. Nos. 5,532,980 and 7,282,147 B2]. In similar published works, various methods of vibration, ranging from purely mechanical vibration featuring linear/rotational motion [W. Li, X. Su, A. Palazzolo, S. Ahmed, and E. Thomas, "Reverse osmosis membrane, seawater desalination with vibration assisted reduced inorganic fouling," Desalination 417 102-114 (2017)] to piezoelectrically-induced [H. Coster, T. D. Farahani, and T. Chilcott, "Production and characterization of piezo-electric membranes," Desalination 283 52-57 (2011)] and magnetically-induced membrane vibration [Q. Yang, H. H. Himstedt, M. Ulbricht, X. Qian, and S. R. Wickramasinghe], "Designing magnetic field responsive nanofiltration membranes," Journal of Membrane Science 430 70-78 (2013)], have been reported. However, these methods suffer from limited applicability for several reasons ranging from the need to shake the flow system in its entirety or unrealistically requiring membrane resonance to incompatibility with the spiral-wound configuration or the potential to damage the membrane selective layer.

As evident from the pervasive nature of chemical cleaning, there are currently no robust chemical-free methods that can be scaled up for industrial processes. The vibratory shear-enhanced process (VSEP) technology by New Logic Research, which generates vibrations to induce shear on the membrane surface, is the only chemical-free filtration method available commercially. However, they require a complete replacement of the entire membrane and pressure vessel system, and it is found to be limited in scalability for large-scale production. Similarly, the company IDE is employing osmotically-induced cleaning methods to induce backwashing of permeate water to remove foulants, by replacing the feed water with brine solution. However, the method is slow and has been shown to be ineffective in certain conditions. The method also has limited applicability to the spiral wound configuration.

Given the scale of the challenge and the lack of a viable chemical-free alternative, further investigation in search of an effective chemical-free method of fouling mitigation remains a worthwhile pursuit. Here, we propose a new approach of delivering fouling mitigation through controlled membrane deformation to achieve mechanical fatigue of the membrane-foulant interface and encourage foulant detachment. Experimental results have demonstrated the potential of the method, achieving a cleaning performance similar to chemicals despite shutdown durations being six-fold lower.

SUMMARY

A method and apparatus for controlled deformation for enhanced cleaning of fouled membranes are described herein, where various embodiments of the methods and apparatus may include some or all of the elements, features and steps described below.

Enhanced cleaning of a fouled membrane in a membrane module for reverse (or forward) osmosis is achieved via controlled deformation of a membrane in a method wherein a feed composition, comprising a solvent and dissolved components, flows into a retentate side of a membrane module. The solvent passes through the membrane from the retentate side to a permeate side (or draw side in the case of forward osmosis) of the membrane module while retaining the dissolved components on the membrane. As a foulant (formed, e.g., of organic solids from the feed accumulated as retentate on the upstream surface of the membrane) accumulates on either side of the membrane, a driving force, which can be generated by first generating a driving signal, is generated across the membrane, wherein the membrane responds cyclically by deforming back and forth toward the permeate (or draw) side and toward the retentate side. The foulant is dislodged from the membrane via mechanical fatigue at the foulant-membrane interface caused by the deformation of the membrane and contact with a spacer in contact with the membrane.

The method employs controlled membrane deformation to induce shear stresses at the membrane-foulant interface that encourage foulant removal. The proposed cleaning method differs from prior art by relying on induced nonhydrodynamic hydrodynamic shear stresses between the membrane and the foulant combined with mechanical failure through fatigue to achieve foulant removal. Mechanical fatigue may be achieved through the introduction of controlled cyclical deformation of the surface without compromising membrane integrity.

The membrane module may be, e.g., a reverse osmosis module, a forward osmosis module, an electrodialysis module, a membrane distillation module, a nanofiltration module, an ultrafiltration module, or a microfiltration module performing a separation process (e.g., desalination). In various embodiments, the separation process may be run in a continuous mode wherein a feed stream is continuously supplied to the module and a reject stream is continuously generated, a semi-batch mode wherein a feed stream is processed in batches featuring intermittent mixing with a fresh feed stream making up for the generated permeate, or a batch mode wherein the feed is processed in batches independently and without mixing.

In different exemplifications, the membrane module may be in different configurations such as the flat sheet configuration, the spiral-wound configuration, the hollow fiber configuration, or any other module configuration featuring membranes to achieve chemical separation.

In various embodiments, the membrane in the module may be a polysulfonamine membrane, a non-polymer membrane (such as a ceramic membrane), a graphene membrane, a carbon nanotube membrane, a membrane formed with aquaporins, or any other structure that functions as a membrane but might not have traditionally been referred to as a membrane.

The system includes an apparatus aimed at generating a driving force that induces membrane deformation in response to a user or computer input. The driving signal for the force can be a signal sent, e.g., through a software interface, mechanical switch, or some other form of input; and the driving force can be a pneumatic, thermal (temperature distribution), acoustic, electric, pressure-induced and/or a magnetic force generated by, e.g., a pump, a heat source, a speaker, a voltage source, and/or a magnet. Where a driving force deforms the membrane, the driving force can be a fluctuating force with a frequency, amplitude, and waveform selected to dislodge the foulant.

The cleaning method can be applied across a single module or a select group of modules in stages to achieve controlled deformation for large-scale systems. The disclosure of a multi-stage implementation of chemical-free cleaning herein is novel and enables the cleaning method to encompass a wide variety of pressure vessels or membrane trains. The allocation of the number of modules across which the method is applied in stages may be optimized for improved fouling mitigation.

In various exemplifications, the cleaning method can be applied through a simple retrofit to commercially-existing modules. The cleaning process may be performed either continuously to deliver continuous antifouling or periodically to achieve periodic fouling mitigation. Additionally, the foulant can be removed and cleaning may be achieved without introducing any cleaning chemicals or in combination with cleaning chemical to achieve synergetic performance.

Given the dramatically reduced shutdown durations, another element of novelty surrounding the method herein is that it enables membrane cleaning at frequencies currently inaccessible under state-of-the-art technology. Enabling greater cleaning frequencies (i.e., cleaning more frequently) could prove disruptive in practice as such a development would not only extend membrane lifetime by avoiding irreversible fouling, but also can lead to higher average system fluxes or productivities.

In various exemplifications, the system may feature elements of automation and artificial intelligence to predict optimal cleaning protocols while monitoring existing system conditions. Existing cleaning technologies are labor intensive, unoptimized, time consuming, and pose unnecessary risk to workers who must handle hazardous chemicals. Unlike other approaches in the field, the proposed cleaning approach is compatible with automation and could in turn eliminate a major bottleneck in membrane processes while also improve the resiliency of the processes to better cope in the event of a crisis or major demand surge.

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Figure 5:
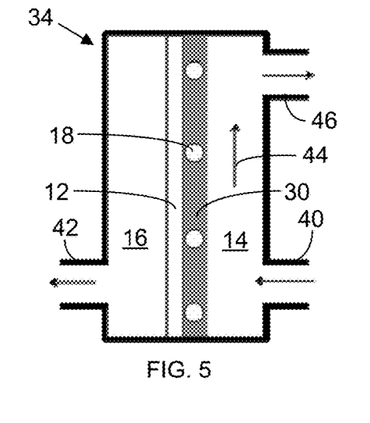
FIGS. 5 and 6 provide a schematic demonstration of deformation-induced cleaning (DIC), illustrating regular filtration 34 (FIG. 5) and DIC cleaning 36 (FIG. 6) operation modes. During the cleaning operation, as shown in FIG. 6, a permeate pressure signal 48 is introduced, causing the membrane 12 to deflect.
Figure 10:
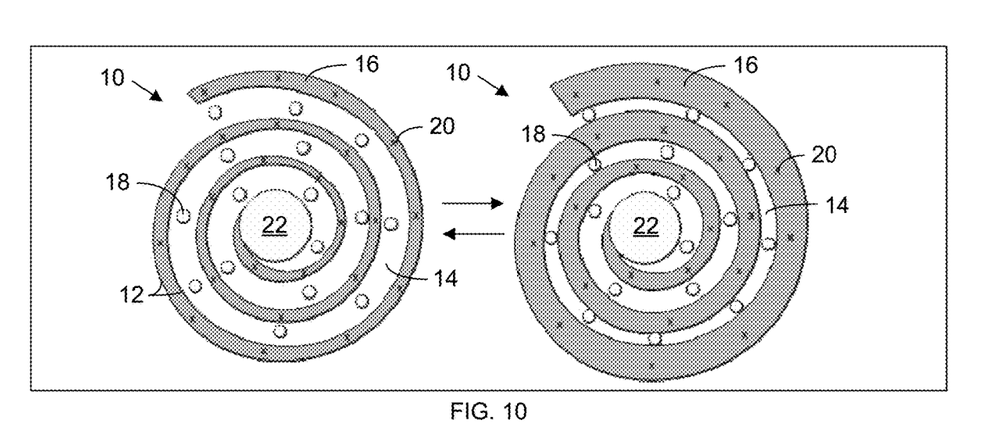
FIG. 10 is an illustration of the expansion and contraction of a permeate channel 16 in a spiral-wound membrane module 10 when the permeate channel 16 is subjected to the pressure signal in deformation-induced cleaning.

The method and system disclosed herein may be applied to any membrane module employed in a separation process. As shown in FIGS. 5 and 10, a membrane module is primarily composed of (a) a feed channel 14 and a permeate or draw channel 16 separated by a membrane 12; (b) spacers 18 and 20; (c) a membrane housing or a pressure vessel in which the other components are contained; and (c) a device to drive the separation process, such as a pump in the case of a pressure-driven process, such as reverse osmosis; a voltage/current source in the case of an electrically-driven process, such as electrodialysis; or a heat source in the case of a thermally-driven process, such as membrane distillation. In the exemplification of FIG. 10, the permeate channel 16 is rolled into a spiral, wherein the permeate channel 16 leads to a central permeate tube 22. These modules come in a variety of configurations, including the flat-sheet, plate-and-frame, spiral-wound, and hollow-fiber membrane configuration. A typical processing plant may employ on average hundreds to thousands of such membrane modules.

Figure 1:
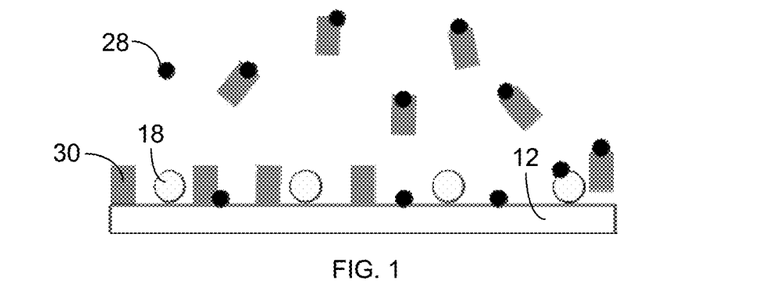
FIG. 1 schematically illustrates a conventional chemical cleaning where chemical cleaning agents 28 remove foulant 30 from the surface of a membrane 12.
Figure 2:
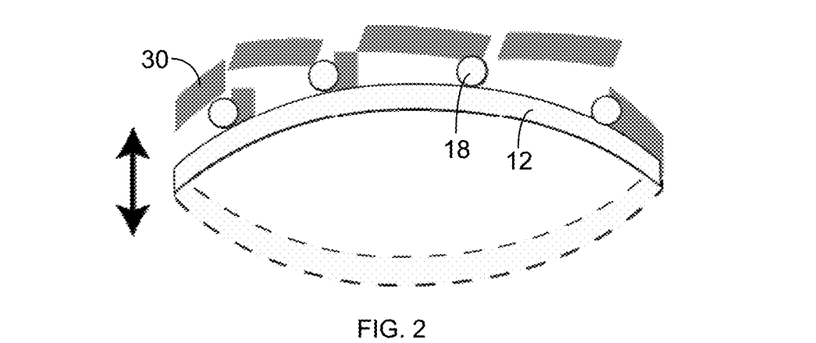
FIG. 2 schematically illustrates a chemical-free exemplification of the deformation-induced cleaning procedure proposed herein, showing the fragmentation and release of the foulant 30 from the surface of the membrane 12.
Figure 3:
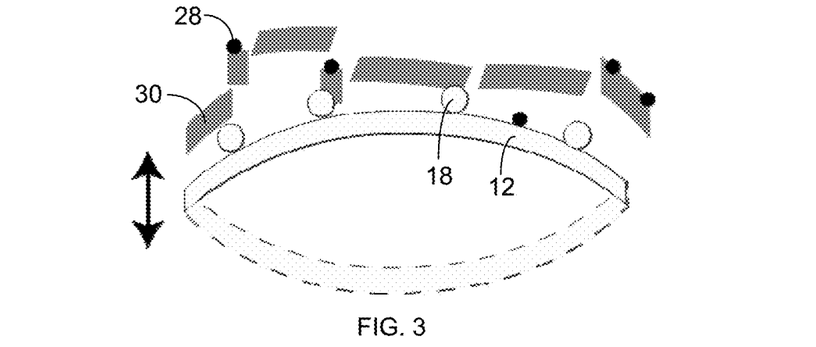
FIG. 3 schematically illustrates an exemplification of a hybrid cleaning method combining both a deformation-induced cleaning procedure with chemicals to achieve a synergetic performance in terms of foulant 30 removal.

FIGS. 1 and 2 compare (a) traditional chemical cleaning, relying solely on the use of harsh chemicals 28, such as acids, bases, biocides, or oxidants, to remove foulant 30 from a membrane 12 to (b) deformation-induced cleaning (DIC) where controlled membrane deformation, shown via the arrow in FIG. 2, is employed to induce shear stresses between the membrane 12 and the foulant layer 30 to encourage detachment. In some instances, fouling mitigation may be achieved completely absent the addition of chemical cleaning agents. In other instances, DIC may be employed in combination with chemical methods, as shown in FIG. 3, to achieve a potentially synergetic effect. Combining DIC with chemicals 28 can provide synergy by removing foulant 30 in regions experiencing limited deformation while speeding up the foulant removal process and reducing chemical use and waste generation that would otherwise be necessary should chemical methods be used in isolation.

Figure 4:
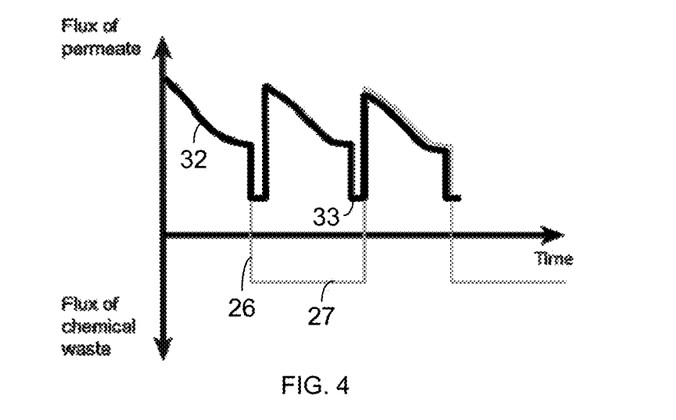
FIG. 4 offers a comparison of the two methods (chemical cleaning 26 and deformation-induced cleaning 32) shown in FIGS. 1 and 2 in terms of water production/waste generation and their respective cleaning times, respectively shown as the horizontal sections 27 and 33 (figure not drawn to scale). The duration for deformation-induced cleaning 32 and its associated waste generation are both notably smaller than they are for chemical cleaning 26.

A comparison of the two methods (chemical cleaning 26 and deformation-induced cleaning 32) is provided in FIG. 4 in terms of water production/waste generation and their respective cleaning times 27 and 33. As seen therein, the duration 33 for deformation-induced cleaning 32 and its associated waste generation are both notably smaller than the duration 27 and waste generation for chemical cleaning 26.

The proposed methods and systems present several differentiating aspects compared to other chemical-free alternatives. In contrast to mechanical backwashing, wherein the flow is reversed across the membrane to achieve foulant removal, DIC relies on shear stresses induced at the membrane-foulant interface through controlled-surface deformation to achieve its effectiveness. This distinction is of paramount importance, as mechanical backwashing risks damaging the ultrathin selective layer of membranes in applications such as reverse osmosis. Additionally, commercially available spiral-wound modules have not been designed to be mechanically backwashed. This distinction becomes even more important given that DIC employs mechanical fatigue of the membrane-foulant interface to encourage detachment. Employing mechanical fatigue through cycling, for instance, allows for fouling mitigation to be achieved using lower deformation amplitudes that help preserve the membrane and increase its longevity without the need for resonance.

Furthermore, previous approaches employing mechanical vibration to achieve fouling mitigation rely on hydrodynamic stresses to achieve the cleaning effect. In contrast, the methods disclosed herein rely on mechanical stresses that directly target and weaken the membrane-foulant interface. Consequently, membrane cleaning may be achieved at a lower cost or energy penalty relative to alternative chemical-free alternatives in the field.

In one exemplification, membrane deformation can be induced through the control of applied pressure across a membrane interface. One or more high-pressure pumps are connected to the membrane module in addition to circulation pumps required to maintain circulation in the system. Pressure is controlled on both the permeate and feed sides, and a pressure driving force is generated through one of the pumps or a back-pressure regulator valve. A single or multiple pressure waves interacting through modulation of amplitudes and/or pairs of frequencies forming beats or wavelet constructions may be employed to aid in fouling mitigation.

In this implementation, pressure on both sides of the membrane are controlled either manually/electronically under user supervision or autonomously to ensure threshold pressures are not exceeded and membrane integrity is preserved. In one exemplification of the cleaning method, the pressure on one side of the membrane is set at 2 bars (200 kPa), while the pressure on the other side of the membrane varies between 0 and 2.25 bars (0-225 kPa). The 0.25 bar (25 kPa) differential at a frequency of 0.5 Hz for 15 minutes delivers the necessary driving force to deform the membrane without excessive amplitudes to ensure membrane integrity is preserved.

Figure 6:
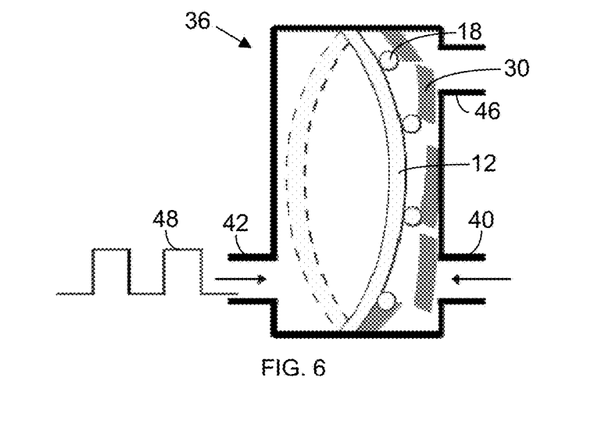

FIGS. 5 and 6 illustrate and compare regular filtration and a DIC cleaning operation on the membrane module. During regular filtration (FIG. 5), a feed enters through a feed input 40. Permeate flows flows from the feed channel 14 through the membrane 12 into a permeate or draw channel 16, where the flux is recorded. Meanwhile, the remaining feed in the feed channel 14 flows as crossflow 44 on the retentate side of the membrane 12 until it is removed through a reject output 46. As the membrane 12 fouls, the permeate flux reduces to a pre-defined threshold, e.g., 65% of its peak, at which point DIC is initiated.

Figure 7:
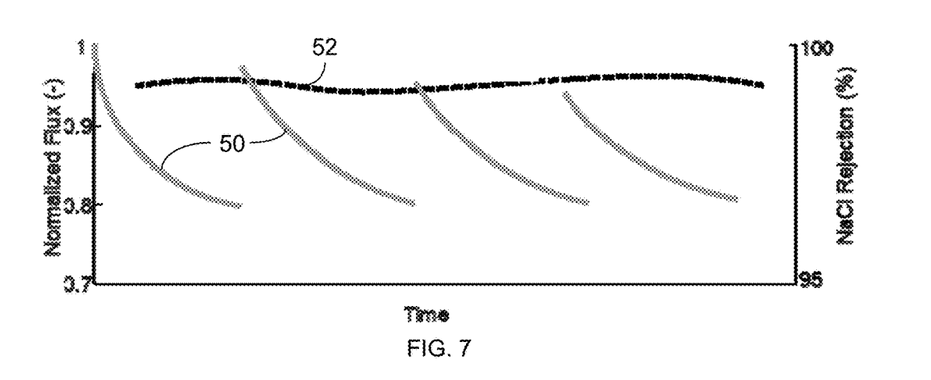
FIG. 7 is a plot depicting the normalized permeate flux 50 as a function of time, along with a plot of NaCl rejection 52 by the membrane as a function of time.

A normalized permeate flux 50 from an exemplification of the DIC method is plotted in FIG. 7 as a function of time, along with a plot of NaCl rejection 52 by the membrane as a function of time. The flux recovery is expected to be repeatable for multiple cycles.

The methods described herein can be governed by a controller with software code non-transitorily stored on a computer-readable medium in communication with a computer processor that executes the code and issues commands to pumps and/or valves to generate the alternating pressure differentials across the membrane on a timed sequence after a determination is made that the membrane needs to be cleaned to remove fouling, e.g., via detection of decreased flow through the membrane or increased pressure on the retentate side of the membrane.

In another embodiment, compressed gas is employed to pneumatically control the pressure across the membrane. A valve, such as a three-port solenoid valve, is connected to the membrane module, the gas supply, and an exhaust outlet. Connection to the membrane module ensures pressure is varied as compressed gas is delivered cyclically into and out of the module. Connection to the gas supply ensures the system has sufficient pressure to drive the membrane deformations. Finally, connection to the exhaust outlet ensures there is no undesired pressure buildup in the system, and a pressure wave or signal of various forms, amplitudes, and frequencies may be delivered. The flow speed may be reduced during the cleaning cycle to lower energy consumption and achieve more effective fouling mitigation.

While the above exemplifications have focused on pressure-driven or pneumatic implementation of the method, other exemplifications can generate controlled deformation of the membrane to induce shear stresses and mechanical fatigue at the membrane-foulant interface via an electrically, magnetically, thermally, or acoustically driven force, for example, that deforms the membrane in response to a varying electrical field, magnetic field, temperature, or acoustic wave. These embodiments when inducing interfacial shear stresses at the membrane-foulant interface leading to fatigue still fall under the method we have described and are modifications that may be implemented in isolation or in combination with one another to achieve effective cleaning performance.

Particular exemplifications of DIC can involve intermittent membrane cleaning, wherein the cleaning phase is initiated once a desired threshold or benchmark, such as minimum allowable flux or maximum allowable driving force (e.g., maximum applied pressure) is reached. The cleaning method may or may not require a system shutdown to operate. Intermittent DIC allows for periodic cleaning to be performed as per the needs of the application at hand.

Other exemplifications of DIC can involve continuous operation, wherein the membrane is deformed continuously to achieve membrane antifouling. Consequently, membrane fluxes are improved and fouling is hindered or mitigated. In this embodiment, permeate generation is not halted, and the system continues to provide separation performance throughout operation.

Figure 8:
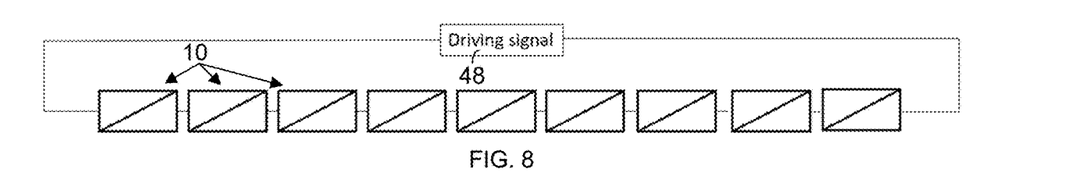
FIG. 8 schematically shows a series of RO modules 10 subject to single-stage controlled deformation, wherein the membrane in each RO module 10 is cleaned via deformation driven by a common driving signal 48.

Exemplification thus far described have assumed the method is applied in a single stage across one or multiple membrane modules. A series of membrane modules 10 connected via conduits and subject to single-stage controlled deformation is shown in FIG. 8, wherein the membrane in each membrane module is cleaned via deformation driven by a common driving signal 48. However, this configuration is provided only as an example of implementing the cleaning method.

Figure 9:
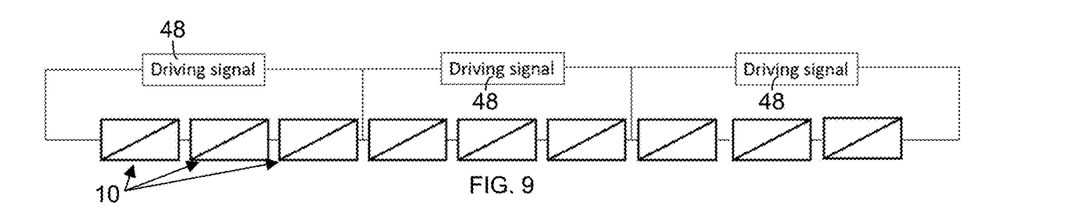
FIG. 9 schematically shows a series of RO modules 10 subject to multi-stage controlled deformation, wherein different driving signals 48 are generated for different membranes in RO modules 10 at different positions in the series of modules 10 to clean those membranes via differentiated deformations.

In multi-stage DIC, the cleaning system is introduced across a preselected number of membrane modules 10 in stages. A connected series of membrane modules 10 subject to multi-stage controlled deformation is shown in FIG. 9, wherein different driving signals 48 are generated for different membranes in membrane modules 10 at different positions in the series of modules to clean those membranes via differentiated deformations. This ensures that every module 10 receives the required differential in driving force to achieve foulant removal. This implementation becomes increasingly important in large-scale applications where the driving force may be variable across the length of the flow system due to practical limitations. Absent this implementation, the user may resort to oversupplying the driving force differential and risk membrane damage or settle for a driving force that decays in the flow direction and achieves subpar cleaning performance.

Applying the methods may require calibration to ensure that the appropriate differential in driving force for the given application and the type of fouling under consideration is provided. Providing the appropriate driving force differential is important as oversupplying the differential in driving force may lead to membrane damage, while undersupplying may lead to ineffective performance.

To that end, particular exemplifications of the calibration method measures the shear strength and the adhesion energy between the membrane and foulant to provide an estimate of the shear stresses necessary to detach the foulants. These measurements may be conducted using lap shear tests and adhesion energy measurement experiments, for example. From there, theoretical or numerical studies can be employed to predict the shear stresses generated via membrane deformation. The two results are then combined to provide a starting point before experiments are later used to optimize the cleaning protocol.

Figure 12:
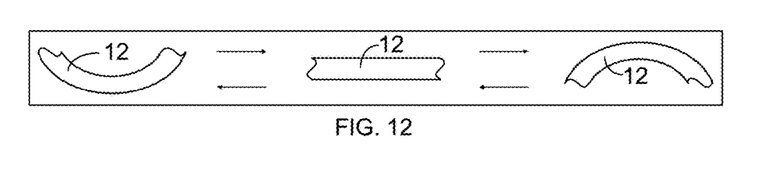
FIG. 12 shows application of the DIC method to deform a membrane 12 from a flat neutral position (center) downward with a downward force (at left) or upward with an upward force (at right).

In exemplifications of DIC, a signal with an alternating sign or polarity can be used to cause the membrane 12 to deform with opposing concavities (concave in/concave out), as shown in FIGS. 6 and 12. Here, the alternating driving force causes the membrane 12 to move toward and away from the feed spacer 18. The feed spacer 18 may be helpful in cutting the foulant layer 30 into smaller sections as the membrane 12 deforms in these or other embodiments.

There are two possible mechanisms of foulant delamination using DIC. First, foulant delamination may be achieved via induced shear stresses—when the interfacial shear stress experienced exceeds the shear strength. Second, foulant delamination may also be achieved via strain energy release rate—when the adhesion energy between the membrane and foulant layer is exceeded by the strain energy per unit area stored in the foulant layer. Both of these mechanisms represent embodiments of the proposed method that may be used independently or in combination to achieve fouling mitigation.

One advantageous characteristic of DIC methods described herein is the shorter shutdown duration that may be required for cleaning. Experimental results have demonstrated that DIC is capable of providing performance competitive with chemical methods despite shutdown durations being six-fold lower. For example, desalination plant operators often have to stop production to run chemical cleaning solutions through their systems for up to 8 hours every cleaning cycle (occurring up to once every three weeks). In the dairy industry, operators typically need to clean the membrane for 4-6 hours a day. These long shutdown durations force operators to delay the necessary cleaning of the membranes so as to meet the target production rates, which may compromise membranes and cause irreversible fouling.

Our studies have shown that the shortened shutdown durations using DIC in desalination, for example, have the potential to increase the plant average flux by 5-6%, reduce the specific energy consumption by 10%, and lower the cost of water by around $0.1-0.2/m$^3$ of water produced. Given the dramatically reduced shutdown durations, one element of novelty surrounding the method disclosed is enabling membrane cleaning at frequencies currently inaccessible under state-of-the-art technology. Enabling greater cleaning frequencies (i.e., cleaning more often) results in optimal plant operation featuring more frequent cleanings, higher average fluxes, and lower energy consumption. The frequency and duration of cleaning can be optimized for a given application and feed of specified fouling type and propensity.

In the disclosure thus far, the focus has been primarily on user-operated cleaning for simplicity. However, other exemplifications of the method can also feature elements of automation and artificial intelligence to predict optimal cleaning protocols while monitoring existing system conditions. For example, data can be collected on-site to train models that can boost the method's performance and competitiveness in real-time.

Since existing technologies tend to be labor-intensive, unoptimized, and time-consuming, and also pose unnecessary risk to workers who must handle hazardous chemicals, the methods described herein can, in turn, eliminate a major bottleneck and allow membrane cleaning to be operated remotely in contrast with existing state-of-the-art which requires user-supervision and is not optimized in real-time as a function of process conditions.

In the exemplification shown in FIG. 10, a spiral-wound membrane module 10 is subjected to DIC cleaning, where the permeate channel 16 expands (right) and contracts (left) as the driving force is varied. Another exemplification features the application of DIC to spiral-wound membranes 12 without the need for expansion/contraction of the permeate channel 16. In this case, the membrane 12 is deformed in place in response to a varying driving force (e.g., a varying electric/magnetic field).

Figure 11:
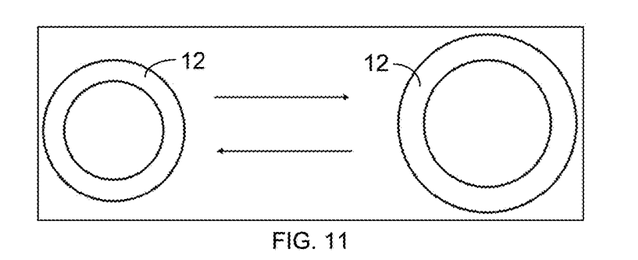
FIG. 11 shows application of the DIC method to expand a hollow-fiber membrane 12 via expansion (right) and contraction (left) as a force (e.g., pressure) inside the fiber membrane 12 increases to cause expansion or decreases to cause contraction.

In additional exemplifications, a hollow-fiber membrane 10 can similarly be subjected to DIC cleaning, as shown in FIG. 11, where the hollow fiber expands (right) and contracts (left) as a force (e.g., pressure) inside the fiber increases to cause expansion or decreases to cause contraction. In yet another exemplification, FIG. 12 shows application of the DIC method to deform a membrane 12 from a flat neutral position (center) downward with a downward force (at left) or upward with an upward force (at right).

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for controlled deformation for enhanced cleaning of a fouled membrane, comprising:
    flowing a feed composition comprising a solvent and dissolved components in the solvent into a retentate side of a membrane module including a membrane;
    passing the solvent through the membrane from the retentate side to a permeate or draw side of the membrane module while retaining the dissolved components on the retentate side;
    as a foulant accumulates on either side of the membrane, generating a driving force across the membrane, wherein the membrane responds cyclically by deforming back and forth toward the permeate or draw side and toward the retentate side, wherein pressure on the permeate or draw side of the membrane is increased to a pressure in a range from 0.05 to 0.5 bar above pressure on the retentate side of the membrane; and
    dislodging the foulant from the membrane via mechanical fatigue resulting from fluctuating shear stresses at the foulant-membrane interface caused by the deformation of the membrane across the cyclic deformations and via contact of the foulant with a spacer, wherein the spacer cuts the foulant into smaller sections as the membrane moves toward the spacer.

2. The method of claim 1, wherein the membrane module has a spiral-wound, hollow-fiber, or flat-sheet configuration.

3. The method of claim 1, wherein the membrane module is selected from a reverse-osmosis module, a nanofiltration module, a microfiltration module, an ultrafiltration module, a forward-osmosis module, an electrodialysis module, and a membrane-distillation module.

4. The method of claim 1, wherein the foulant is an organic composition, wherein the driving force is a pressure differential generated via at least one of the following:

control of at least one valve governing flow into or out of the membrane module;

pressure fluctuations introduced by a high-pressure or circulation pump within the flow system; and modulating the backpressure of a mass flow rate to induce pressure fluctuations in the flow system.

5. The method of claim 1, wherein the spacer cuts the foulant into smaller pieces as the membrane is deformed.

6. The method of claim 1, wherein the foulant is removed without introducing any cleaning chemicals to the feed composition.

7. The method of claim 1, wherein the driving force across the membrane alternates such that the membrane deforms at a frequency in a range from 0.1 Hz to 5 Hz.

8. The method of claim 7, wherein the driving force across the membrane alternates such that the membrane deforms at a frequency of about 0.5 Hz.

9. The method of claim 1, wherein the pressure on the permeate or draw side of the membrane is increased to no more than 0.25 bar above the pressure on the retentate side of the membrane to deform the membrane toward the retentate side.

10. The method of claim 1, wherein the driving force comprises at least one of a pneumatic, thermal, acoustic, electric, and magnetic force.

11. The method of claim 1, wherein the driving force deforms the membrane, and wherein the driving force is a fluctuating force that has a frequency, amplitude, and waveform that dislodges the foulant.

12. The method of claim 1, further comprising repeating the method in a plurality of membrane modules connected in series, wherein the generation of the driving force includes generating a first driving force to deform the membrane in at least one of the membrane modules.

13. The method of claim 12, wherein the generation of the driving force includes generating a second driving force distinct from the first driving force, and wherein the second driving force deforms the membrane in at least one other membrane module.

14. The method of claim 13, wherein the first and second driving forces are forces of varying pressure.

15. The method of claim 1, wherein the foulant is dislodged without adding any chemical cleaning agents.

16. The method of claim 1, wherein nonhydrodynamic interfacial shear stresses are induced at an interface of the membrane and the foulant to weaken the interface and cause mechanical fatigue at the interface.

17. The method of claim 1, wherein the dislodging of the foulant is facilitated by at least one of interfacial shear stress between the foulant and the membrane and strain energy release rate.

18. The method of claim 1, wherein the driving force is generated by generating opposite polarities on opposite sides of the membrane to induce membrane deformations of opposite concavities.

19. The method of claim 1, wherein the back-and-forth deformation of the membrane includes generation of opposing concavities of the membrane toward the permeate or draw side and toward the retentate side.

* * * * *